Figure 1:
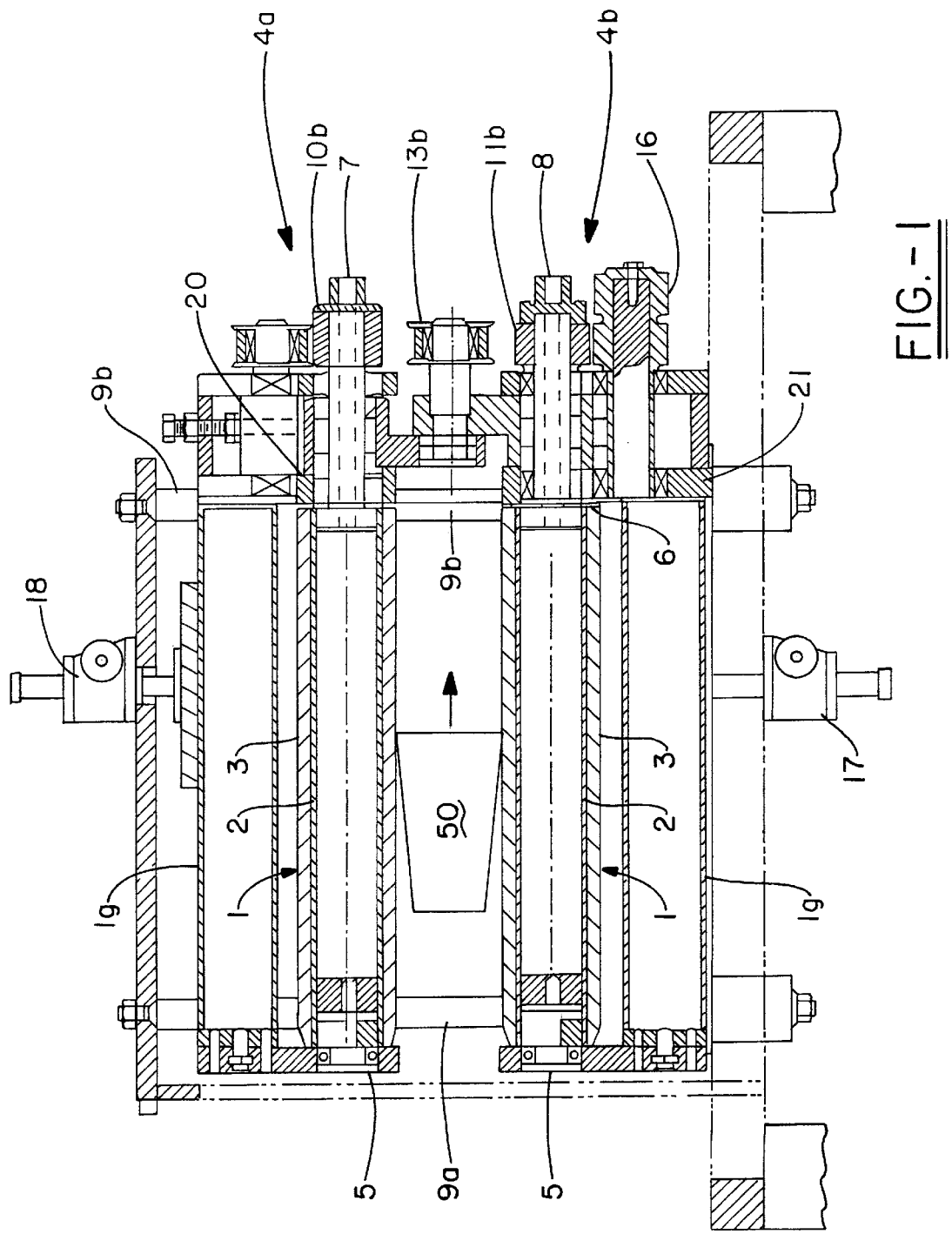

United States Patent
Merz

Patent Number: 6,129,537
Date of Patent: Oct. 10, 2000

[54] LIP ROLLING APPARATUS

[75] Inventor: Ulrich Merz, Gau-Odernheim, Germany

[73] Assignee: Bellaform Extrusionstechnik GmbH, Germany

[21] Appl. No.: 09/096,906

[22] Filed: Jun. 12, 1998

[30] Foreign Application Priority Data

Jun. 27, 1997 [DE] Germany ............ 197 27 495

[51] Int. Cl.$^7$ .................... B29C 53/34
[52] U.S. Cl. .............. 425/193; 425/363; 425/367; 425/392
[58] Field of Search ............ 425/193, 194, 425/367, 385, 392, 363

[56] References Cited

U.S. PATENT DOCUMENTS

| | | | |
|---|---|---|---|
| 3,339,005 | 8/1967 | Brown et al. ............ | 264/297.5 |
| 3,579,737 | 5/1971 | Gerber et al. ............ | 425/193 |
| 3,676,543 | 7/1972 | Reinhold et al. ......... | 264/296 |
| 4,391,768 | 7/1983 | Arends et al. ............ | 264/322 |

FOREIGN PATENT DOCUMENTS 1064611   4/1967   United Kingdom.

*Primary Examiner*—Harold Pyon
*Assistant Examiner*—Donald Heckenberg
*Attorney, Agent, or Firm*—Hudak & Shunk Co., L.P.A.; Daniel J. Hudak

[57] ABSTRACT

In order to easily convert a lip rolling apparatus to different cup diameters, without involving a change of the phase relation of the roll feeds (1) relative to one another, two roll feed pairs are arranged oppositely, the roll feeds (1) of each pair being arranged at a fixed spacing (D1), individually, relative to one another, and the mutual spacing of the roll feed pairs is variable. The drive gears (10a,b, 11a,b) are adapted to be driven by a common drive belt (12) traveling over at least one deflection sheave (13a,b) arranged so as to be movable along the line of symmetry (40) between the drive gear pairs (10a,b, 11a,b). The drive gears (10a,b, 11a,b) have the same diameter as the deflection sheaves (13a, 13b) on a compensating knuckle (30a, 30b).

7 Claims, 4 Drawing Sheets

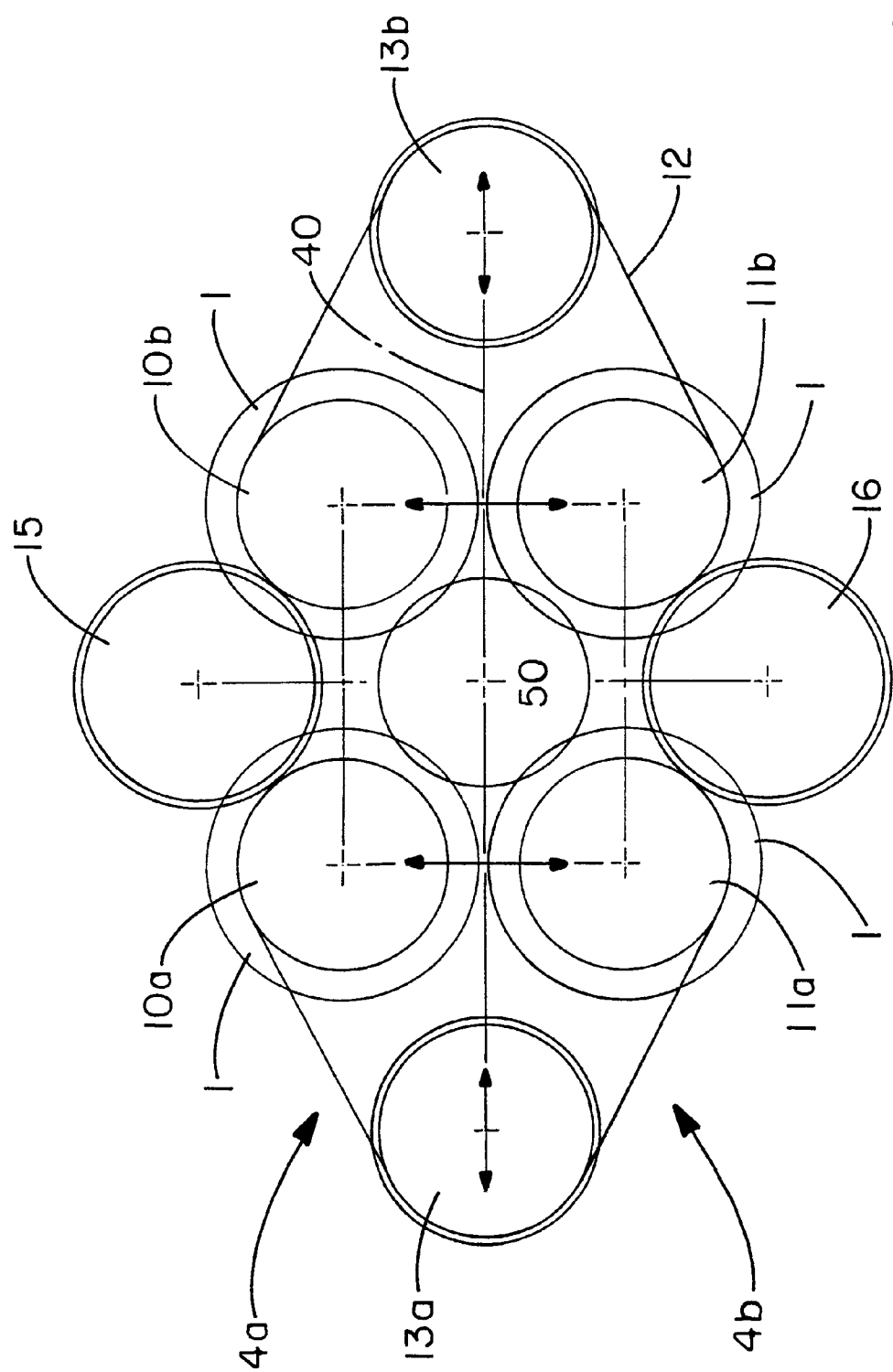

LIP ROLLING APPARATUS

SPECIFICATION

The invention relates to a lip rolling apparatus with roll feeds arranged parallel to one another and provided with drive wheels.

Lip rolling apparatuses are used to produce a rolled rim on blanked, deep-drawn plastic cups, since their opening rim is after the manufacturing process sharp-edged such that the cups are unusable without this additional processing step. The cups are fed in a stack to the lip rolling apparatus, where they are gripped by heated roll feeds which on their surfaces feature thread-like grooves in which the rolled rim is shaped during the pass of the cup. Owing to the rotation of the roll feeds, the cups are at the same time passed through the lip rolling apparatus. The drive for the roll feeds is provided on one of the roll feed end faces by way of appropriately arranged drive wheels.

In order for each cup to be gripped on its rim at the start of the shaping section, simultaneously by all roll feeds, and not to be distorted while passing along the roll feeds, the thread-like grooves must have a fixed phase relation to one another. Once set, this phase relation must not change, notably not when the mutual spacing of the roll feeds is altered in order to enable the processing of cups with different diameters. Refitting to a different cup diameter requires also a refitting in the area of the drive system, wherein the synchronous drive of all roll feeds must be guaranteed also after the refitting process. Such refitting measures are normally expensive and require upon completion a readjustment of the roll feeds to set the phase relation.

Therefore, the objective underlying the invention is to improve such a lip rolling apparatus to the effect that refitting to different cup diameters can be performed easily, without necessitating modifications in the area of the drive system and without changes of the phase relation among the roll feeds.

This objective is satisfied with a lip rolling apparatus according to the characteristics of the present invention. Favorable embodiments are described in the subclaims.

It has been shown that the cups receive a far better guidance in the shaping process when using totally four roll feeds, instead of the usually three roll feeds. Moreover, four roll feeds allow a better combination to a symmetric arrangement, which in turn entails advantages with respect to adaptations to different cup diameters. The four roll feeds are grouped in two roll feed pairs of opposite arrangement, with the roll feeds of each pair being arranged at a fixed mutual spacing, while the mutual spacing of the roll feed pairs is variable. Adaptation to different cup diameters does not require moving all roll feeds in radial direction from a common center point. It is entirely sufficient to move the roll feed pairs oppositely.

The drive wheels can be driven by a common drive belt, which may be powered by a motor. Since the drive belt has a given length, changing the spacing of the roll feed pairs necessitates a length compensation. This is accomplished according to the invention by providing at least one reversing roll, which is arranged so as to be movable along the line of symmetry between the drive wheel pairs.

Two deflection sheaves are preferably provided, arranged oppositely on the line of symmetry. As the roll feed pairs, and thus also the drive wheel pairs, are being moved toward one another for adjustment of a smaller cup diameter, the two deflection sheaves move away from the common center point and migrate outward, keeping the drive belt taut. Conversely, the two deflection sheaves move toward one another as the spacing between the roll feed pairs increases.

In order for the roll feeds not to rotate out of adjustment in this process and remain exactly in their position, all of the drive wheels, including the deflection sheaves, must have the same diameter. In a movement of the roll feed pairs, this results in a change of only the contact surface of the drive belt on the drive wheels, without any rotation of the drive wheels. A reduction of the contact surface on the drive wheels is associated at the same time with an enlargement of the contact surface of the drive belt on the deflection sheaves, meaning that the total of the wraps remains constant in any position of the roll feed pairs. Constant remains also the distance of the reversing rolls from the adjacent drive wheels.

Refitting to a different cup diameter is thus possible easily, without involving changes of the phase relation of the roll feeds relative to one another and without requiring conversion measures on the drive system.

The two deflection sheaves are preferably arranged, each, on a compensating knuckle connecting the roll feed pairs. According to a preferred embodiment, said compensating knuckle may consist of an angular knuckle with two knuckle arms of identical length supporting the deflection sheave at the common point of articulation and hinged with their free ends in the axis of rotation of the roll feeds of opposing roll feed pairs. This assures that the distance between the deflection sheaves and adjacent drive wheels remains constant. A change in the spacing of the roll feed pairs causes merely a change of the angles between the knuckle arms, with the common point of articulation, and thus the deflection sheave mounted there, moving on the previously described line of symmetry.

The drive wheels are preferably gears, and the drive belt may be a cogged belt, a roller chain or an inverted-tooth chain.

In addition, an additional idler pulley may be arranged between the drive wheels of a roll feed pair.

To further improve the flexibility of the lip rolling apparatus and simplify its changeover, the roll feed has a modular structure. This means that the roll feed features a roll feed core on which an interchangeable roll feed shell is mounted. The roll feed core may remain in the apparatus as the shell is replaced. Retained thereby is also the rotational position of the core and, thus, that of the entire roll feed in a shell replacement. The phase relation between roll feeds is retained with the aid of appropriate fixing dogs or similar suitable measures as a new or differently configured roll feed shell is installed. No additional adjustment is required after conversion.

Since the lip rolling apparatus is part of an overall apparatus which, among others, comprises also feed systems of the cups, each roll feed pair is suitably movable independently. This allows a better adaptation to the remaining components of such overall apparatus.

Figure 2:
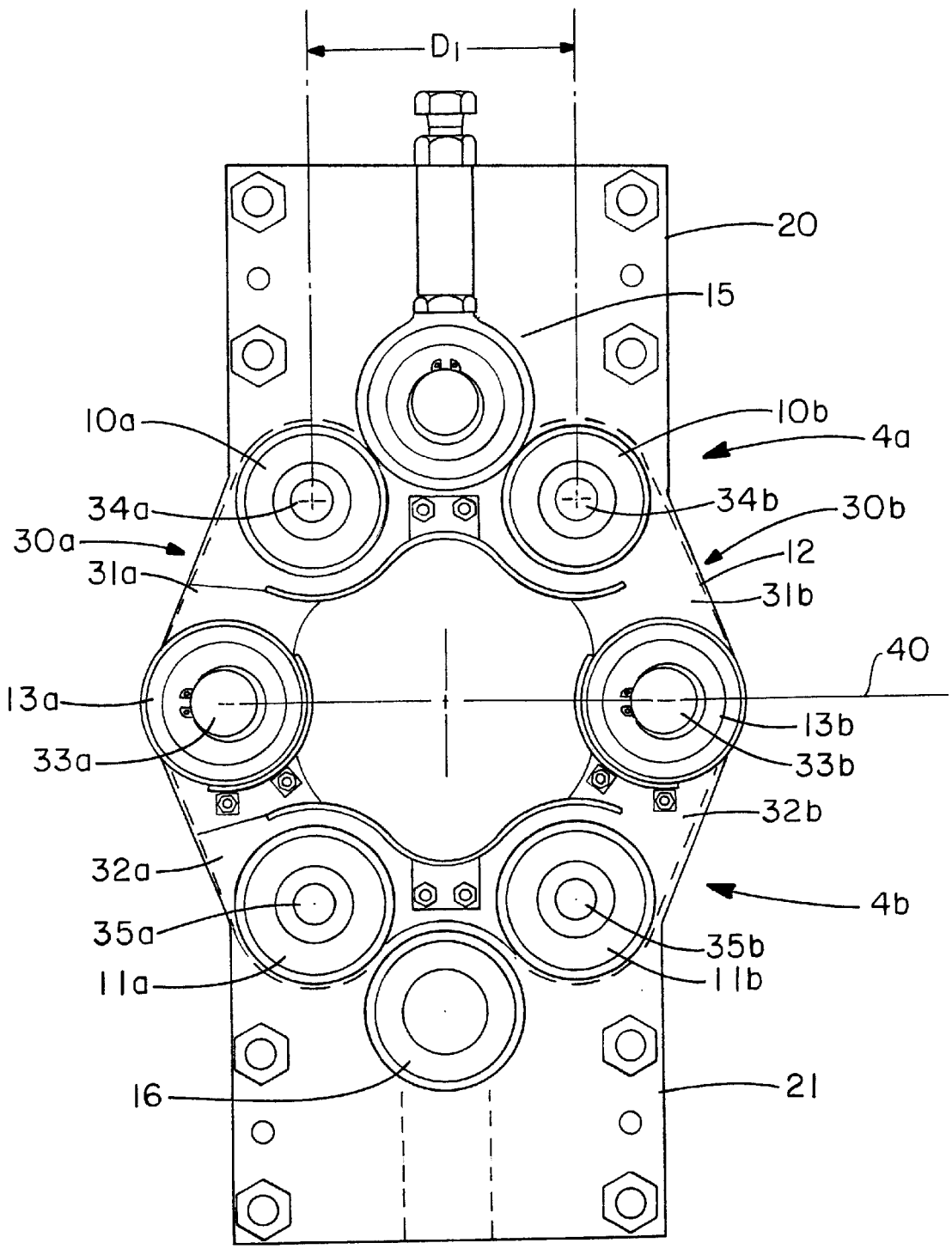

Favorable embodiments are more fully explained hereafter with the aid of the drawings, showing in:

FIG. 1, a vertical section of the lip rolling apparatus in longitudinal direction;

FIG. 2, a plan view of the end face of the lip rolling apparatus including drive means as shown in FIG. 1;

FIG.[000c]simplified illustrations of FIG. 2 illustrating the position of the roll feeds with different cup diameters.

FIG. 1 shows a vertical section of a lip rolling apparatus. Visible of the overall four roll feeds 1 are merely two, the top roll feed 1 pertaining to the top roll feed pair 4a, and the bottom roll feed I to the bottom roll feed pair 4b. Illustrated in section, the roll feeds 1 feature a roll feed core 2 and a replaceable roll feed shell 3 provided with thread-like grooves which, however, are not visible in the illustration shown here. Mounted on the right-hand end of the roll feeds are the gears 10a, b, 11a, b, on the roll feed axle, serving to drive the roll feeds 1. The cups to be provided with a rolled rim—one cup 50 being pictured as an example—are fed from the left, in lying position, and transported to the right by the rotation of the roll feeds 1, the rolled rim being formed in the grooving of the roll feeds 1. Since an elevated temperature is required for that purpose, the roll feed cores are hollow and swept by a heated liquid supplied via water ports 7, 8.

The roll feed core 2 possesses on its right-hand end a shoulder 6 on which the roll feed shell 3 butts with its end face. A replaceable end plate S is provided on the opposite end, allowing easy removal for replacement of the roll feed shell 3.

The roll feeds 1 are mounted rotatably in a top mounting plate 20 and a bottom mounting plate 21, these being connected to one another by way of a guide rod 9a, b. The top roll feed pair 4a and the bottom roll feed pair 4b are connected each to an adjustment device 17, 18 of their own, by way of a connecting rod 19, said device allowing an adjustment of the roll feed pairs 4a, b to set different cup diameters.

FIG. 2 shows a plan view of the right-hand end face of the lip rolling apparatus illustrated in FIG. 1. The top roll feeds 1 are mounted rotatably on the top mounting plate 20, with only the pertaining drive wheels 10a, 10b being visible in this illustration. Owing to their mounting in a common mounting plate 20, the two drive wheels 10a, 10b, which in the embodiment shown here are mutually spaced a fixed distance D1. The bottom roll feed pair 4b with drive wheels 11a and 11b mounted in the bottom mounting plate 21, forms a corresponding arrangement.

Arranged between the drive wheels 10a, 11a and 10b, 11b respectively, is a compensating knuckle 30a, 30b each which joins the top mounting plate 20 to the bottom mounting plate 21. Each compensating knuckle 30a, 30b has two equally long shanks 31a, 32a and 31b, 32b, respectively. Arranged in the common point of articulation 33a, 33b is a deflection sheave 13a, 13b each. Due to the identical length of the knuckle arms 31a, 32a and 31b, 32b, said points of articulation 33a, 33b, or the deflection sheaves 13a, 13b, are located on the line of symmetry 40 extending respectively in the center between the roll feed pairs 4a,b or their drive gear pairs 10a,b and 11a,b. The free ends of the knuckle arms 31a, 32a are in the hinge points 34a, 35a or 34b and 35b joined to the pertaining axles of the roll feeds 1. The four drive gears 10a,b, along with the deflection sheaves 13a, 13b, are disposed approximately on a circle in the position shown here. The drive gears 10a,b, 11a,b and deflection sheaves 13a,b are wrapped by a common drive belt 12, which is tensioned by means of an idler pulley 15 installed on the top mounting plate, and driven by means of a drive wheel 16 arranged on the bottom mounting plate 21. Not illustrated in FIG. 2, the cups to be shaped are contained in the interior of the circular arrangement of the drive gears and deflection sheaves.

Figure 3B:
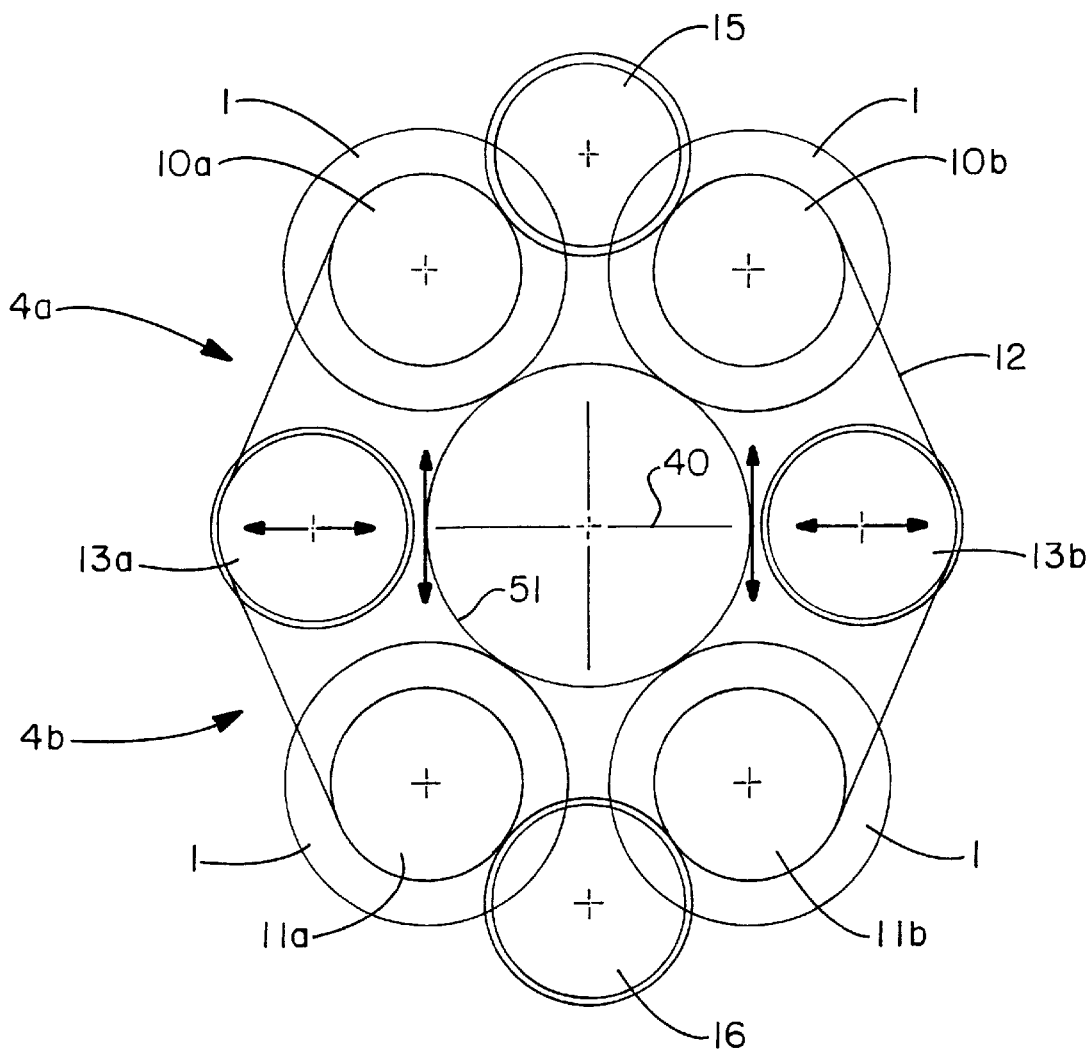

The adaptation of the apparatus to different cup diameters is explained with the aid of the simplified illustration relative to FIG. 3a and 3b.

Illustrated in FIG. 3a is a cup 50 with a small diameter. The roll feeds 1 with the pertaining drive gears 10a,b and 11a,b, respectively, have been moved toward one another, indicated by the two vertical arrows. The two deflection sheaves 13a, 13b have at the same time moved outward, so that the common drive belt 12 remains taut. The wrap around the deflection sheaves 13a, 13b has increased here, accompanied by a reduction of the wrap around the drive gears 10a,b and 11a,b, respectively.

If from this position a changeover is to be made to a larger cup diameter, such as illustrated in FIG. 3b, the roll feed pairs 4a,b are moved toward one another in the direction of the arrow until assuming the configuration shown in FIG. 3b. In this spreading apart of the roll feed pairs, the deflection sheaves 13a, 13b move simultaneously toward one another along the line of symmetry 40. Only a change of the wrap of the drive gears and deflection sheaves occurs in this movement, but no rotation of the roll feeds 1, which in this movement retain their fixed phase relation. As can be seen from FIG. 2, 3a and 3b, all of the deflection sheaves 13a,b and drive gears 10a,b and 11a,b, respectively, have the same diameter.

List of References
1 Roll feed
2 Roll feed corep
3 Roll feed shell
4a,b Roll feed pair
5 End plate
6 Shoulder
7, 8 Water port
9a, b Guide rod
10a, b Gear
11a, b Gear
12 Cogged belt
13a, b Deflection sheave
15 Idler pulley
16 Drive wheel
17, 18 Adjustment device
19 Connecting rod
20 Top mounting plate
21 Bottom mounting plate
30a, b Compensating knuckle
31a, b Knuckle arm
32a, b Knuckle arm
33a, b Common articulation point
34a, b Hinge point
35a, b Hinge point
40 Line of symmetry
50, 51 Cup

What is claimed is:

1. A lip rolling apparatus which allows adjustment between different cup diameters comprising:

four roll feeds arranged in pairs, said roll feed pairs parallel to each other and arranged oppositely, said roll feeds of each pair spaced a fixed distance relative to one another, while the spacing between said roll feed pairs is adjustable in relation to each other;

a drive wheel operably attached to each of said roll feeds, said drive wheels driven by a common drive belt; and at least one deflection sheave, said deflection sheave arranged so as to be movable along a line of symmetry between said drive wheel pairs, said drive belt traveling over said at least one deflection sheave, said drive wheels and said at least one deflection sheave having a same diameter.

2. An apparatus according to claim 1, wherein two deflection sheaves are provided, said sheaves operatively arranged on a compensating knuckle operatively joining said roll feed pairs.

3. An apparatus according to claim 2, wherein said compensating knuckle features two equally long knuckle arms which in a common point of articulation support the deflection sheave and are hinged at each distal end to an axle of the roll feeds of opposing roll feed pairs.

4. An apparatus according to claim 1, wherein said drive wheels are gears, and said drive belt is a cogged belt, a roller chain or an inverted-tooth chain, and wherein a belt drive system comprising said drive belt, said drive gears, and said deflection sheave is self-adjusting.

5. An apparatus according to claim 4, wherein an idler pulley is arranged between the drive gears of a roll feed pair.

6. An apparatus according to claim 1, wherein said roll feed comprises a roll feed core and, arranged on said core, a replaceable roll feed shell.

7. An apparatus according to claim 1, wherein said roll fed pairs are movable independently of one another.

\* \* \* \* \*